(12) United States Patent
Kuruvilla et al.

(10) Patent No.: US 11,805,134 B2
(45) Date of Patent: *Oct. 31, 2023

(54) SYSTEMS AND METHODS FOR AUTHENTICATING DATA ACCESS REQUESTS

(71) Applicant: The Toronto-Dominion Bank, Toronto (CA)

(72) Inventors: Denny Devasia Kuruvilla, Toronto (CA); Esli Gjini, Etobicoke (CA); Sarah Reeve, Toronto (CA); Matija Bosnjakovic, Oakville (CA); Guy Dagmara, Toronto (CA); Jaspal Singh Samra, Brampton (CA); Abhiney Natarajan, Stoney Creek (CA); Haobin Li, Kitchener (CA); Richard Yu, Mississauga (CA); Md Abdur Razzak Chowdhury, Mississauga (CA); Dani Kartikay, Brampton (CA); Ryan Wu, Vaughan (CA); Andrey Petrov, Toronto (CA); Peter Horvath, Toronto (CA); Prashanth Dappula, King City (CA); Sivashanthan Sivapalan, Markham (CA); Nolan Glynn-Udrow, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,315

(22) Filed: Jan. 25, 2022

(65) Prior Publication Data
US 2022/0150231 A1 May 12, 2022

Related U.S. Application Data

(63) Continuation of application No. 16/520,505, filed on Jul. 24, 2019, now Pat. No. 11,271,947.

(51) Int. Cl.
H04L 9/40 (2022.01)
(52) U.S. Cl.
CPC ........ H04L 63/108 (2013.01); H04L 63/0428 (2013.01); H04L 63/083 (2013.01)
(58) Field of Classification Search
None
See application file for complete search history.

(56) References Cited

U.S. PATENT DOCUMENTS

| 7,415,715 B2 | 8/2008 | Fradkov et al. |
| 7,761,313 B1 | 7/2010 | Brown et al. |

(Continued)

FOREIGN PATENT DOCUMENTS

| CN | 108573448 | 9/2018 |
| KR | 20010105424 | 11/2001 |

OTHER PUBLICATIONS

N/A; Citi Launches Citi Mobile Snapshot Across the U.S, https://www.citigroup.com/citi/news/2014/140521a.htm; Located via Google May 21, 2014.

(Continued)

*Primary Examiner* — Brandon Hoffman
(74) *Attorney, Agent, or Firm* — Rowand LLP

(57) ABSTRACT

A computer-implemented method is disclosed. The method includes: authenticating a user for login to a service for a first authenticated user session; in response to authenticating the user, generating a first data string associated with a first validity period; sending, to a client device associated with the user, the first data string; receiving, from the client device, a data access request to access a first data set at a remote data source, the data access request including the first data string; determining that the first authenticated user session has been terminated at a time of receiving the data access request; validating the first data string based on (Continued)

checking the first validity period; and in response to determining that the first authenticated user session has been terminated and that the first data string is valid, transmitting, to the client device, a data access response including at least a subset of the first data set.

20 Claims, 7 Drawing Sheets

(56) References Cited

U.S. PATENT DOCUMENTS

| | | | |
|---|---|---|---|
| 8,250,102 B2 | 8/2012 | Madhavarapu et al. |
| 8,688,559 B2 | 4/2014 | Calman et al. |
| 8,799,136 B2 | 8/2014 | Brady et al. |
| 8,881,229 B2 | 11/2014 | Barton et al. |
| 9,002,907 B2 | 4/2015 | San Martin et al. |
| 9,148,460 B1 | 9/2015 | Sun et al. |
| 9,367,868 B2 | 6/2016 | McNall et al. |
| 9,369,457 B2 | 6/2016 | Grajek et al. |
| 9,490,984 B2 | 11/2016 | Leicher et al. |
| 9,549,032 B2 | 1/2017 | Boyette et al. |
| 9,979,715 B2 | 5/2018 | Cicchitto et al. |
| 10,262,001 B2 | 4/2019 | Faith et al. |
| 2008/0065510 A1 | 3/2008 | Yu | |
| 2013/0262858 A1* | 10/2013 | Neuman | H04L 9/30 713/155 |
| 2015/0161583 A1 | 6/2015 | Phelps et al. | |
| 2015/0161695 A1 | 6/2015 | Koby et al. | |
| 2015/0379519 A1 | 12/2015 | Schultz et al. | |
| 2017/0099280 A1* | 4/2017 | Goel | H04L 67/146 |
| 2019/0114160 A1 | 4/2019 | Yehuda et al. | |

OTHER PUBLICATIONS

N/A; How to Get Real-Time Quotes; https://www.fidelity.com/customer-service/how-to-get-real-time-quotes; Found via Google Scholar; available at least as early as May 2, 2019.

Christian Zibreg; Yahoo redesigns Finance app for real-time; Found via Google Scholar Jul. 30, 2014.

Editorial Staff; Money Management Executive, Financial Planning; https://www.financial-planning.com/news/morningstar-adds-mutual-fund-data-to-quotespeed; Oct. 11, 2010.

USPTO, Office Action relating to U.S. Appl. No. 16/520,505 dated May 17, 2021.

CIPO: CA Office Action relating to CA application No. 3,050,492, dated Mar. 31, 2023.

* cited by examiner

SYSTEMS AND METHODS FOR AUTHENTICATING DATA ACCESS REQUESTS

CROSS-REFERENCE TO RELATED APPLICATION

The present application claims priority to U.S. Pat. No. 11,271,947 entitled "System and Methods for Authenticating Data Access Requests", the contents of which are herein incorporated by reference in their entirety.

TECHNICAL FIELD

The present disclosure relates to data security and, in particular, to systems and methods for authenticating data access requests.

BACKGROUND

In networked environments, client devices may facilitate user access of remotely hosted data. Users may request access to various data that is provided by a remote data service. For example, a user may request a remote data service to obtain select data from a third-party data source. The remote data service may process such requests and provide the requested data to client devices.

To ensure that data is provided only to authorized entities, a remote data service may implement an authentication gateway for controlling access to data provided by the remote data service. The access control policies of a remote data service may, in some cases, depend on the nature and/or type of data that is provided by the service. For example, if the data comprises time-sensitive information, it is desirable to streamline the authentication process of the service to facilitate easy and quick access to the data for authorized users and their devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
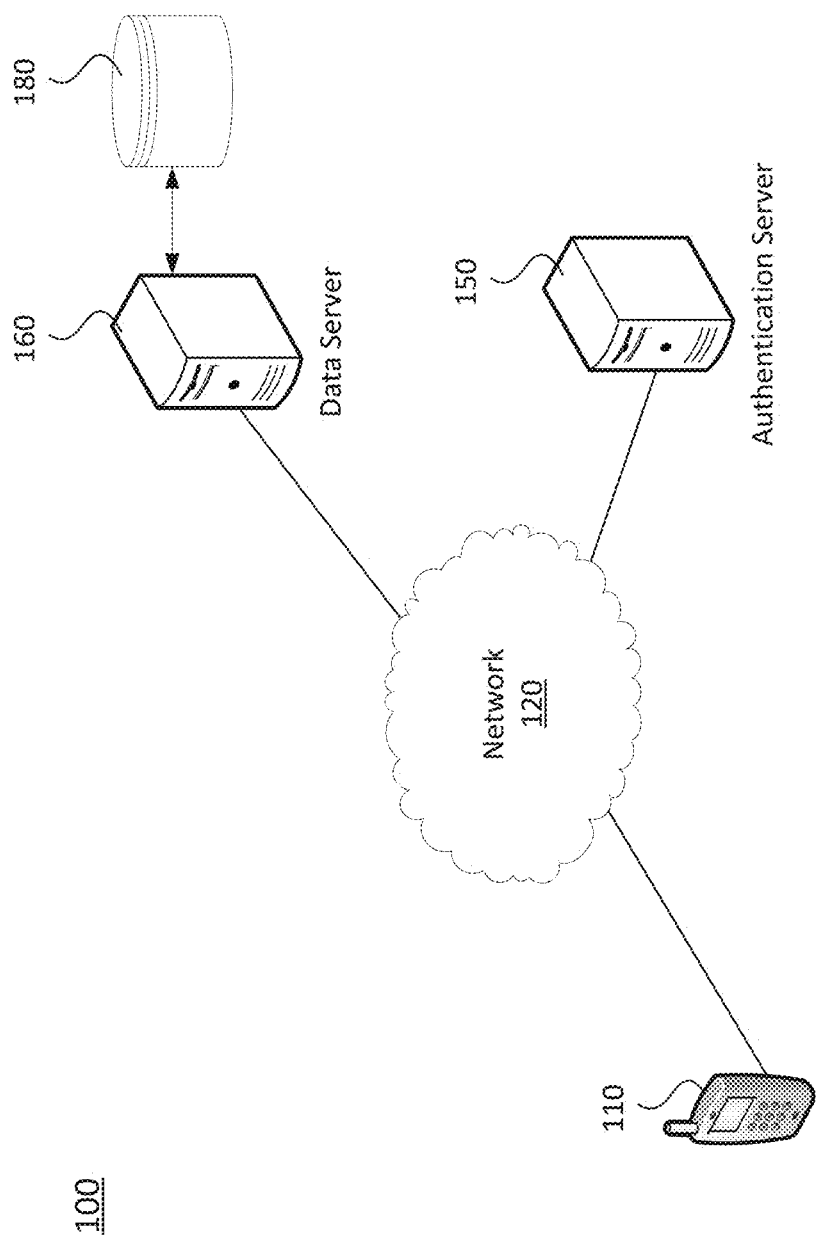
FIG. 1 is a schematic operation diagram illustrating an operating environment of an example embodiment.

In an aspect, the present disclosure describes a computing system. The computing system includes a processor, a communications module coupled to the processor, and a memory coupled to the processor. The memory stores instructions that, when executed, configure the processor to: authenticate a user for login to a service for a first authenticated user session; in response to authenticating the user, generate a first data string associated with a first validity period; send, to a client device associated with the user, the first data string; receive, via the communications module from the client device, a data access request to access a first data set at a remote data source, the data access request including the first data string; determine that the first authenticated user session has been terminated at a time of receiving the data access request; validate the first data string based on checking the first validity period; and in response to determining that the first authenticated user session has been terminated and that the first data string is valid, transmit, to the client device, a data access response including at least a subset of the first data set.

In some implementations, the instructions, when executed, may further configure the processor to: in response to determining that the first data string is not valid, transmit, to the client device, an instruction to request login credentials from the user of the client device.

In some implementations, the first validity period may define an expiry date set as a predetermined number of days from a time of receipt of a login request from the client device to log the user in to the service.

In some implementations, the instructions, when executed, may further configure the processor to encrypt the first data string prior to sending the first data string to the client device, and validating the first data string may include decrypting the encrypted first data string.

In some implementations, the first data string may represent a version identifier that is stored in the memory, and validating the first data string may be based on checking a version associated with the first data string.

In some implementations, the instructions, when executed, may further configure the processor to: authenticate the user for login to the service for a second authenticated user session subsequent to the first authenticated user session; in response to authenticating the user for the second authenticated user session, generate a second data string different from the first data string; and send, to the client device, the second data string and an instruction to replace any currently valid data string stored at the client device with the second data string.

In some implementations, the data access response may include at least the subset of the first data set in response to determining that access of the first data set is a permitted operation in a non-authenticated user session.

In some implementations, validating the first data string may include determining that a current date falls within the first validity period.

In some implementations, the data access request may include a request to retrieve real-time quotes for one or more tradeable objects, and the instructions, when executed, may further configure the processor to transmit, to the remote data source, a query for real-time quotes data.

In some implementations, the first data string may be associated with a predetermined set of operations, and the instructions, when executed, may further configure the processor to: receive, via the communications module from the client device, a request to perform a first operation; and in response to determining that the first operation is not among the predetermined set of operations associated with the first data string, transmit, to the client device, an instruction to request login credentials from a user of the client device.

In another aspect, the present disclosure describes a computer-implemented method. The method includes: authenticating a user for login to a service for a first authenticated user session; in response to authenticating the user, generating a first data string associated with a first validity period; sending, to a client device associated with the user, the first data string; receiving, from the client device, a data access request to access a first data set at a remote data source, the data access request including the first data string; determining that the first authenticated user session has been terminated at a time of receiving the data access request; validating the first data string based on checking the first validity period; and in response to determining that the first authenticated user session has been terminated and that the first data string is valid, transmitting, to the client device, a data access response including at least a subset of the first data set.

Other example embodiments of the present disclosure will be apparent to those of ordinary skill in the art from a review of the following detailed descriptions in conjunction with the drawings.

In the present application, the term "remote data services" is intended to refer broadly to services which host data or are configured to obtain data from third-party data sources. A remote data service may be implemented by a system comprising one or more computing devices (e.g. server computers). A remote data service is communicably connected to a plurality of client devices via a computer network. In particular, a remote data service is configured to receive data access requests from client devices and provide sets of data to the requesting client devices. For example, a remote data service may, upon request from a client device, obtain data from one or more third-party servers and provide all or parts of the obtained data to the requesting client device.

In the present application, the term "data access requests" is intended to refer broadly to requests originating from client devices to obtain data from a remote data service. A data access request may, for example, be a request to gain direct access to data that is hosted by a remote data service. As another example, a data access request may encompass a request for a remote data service to obtain select data from one or more third-party data sources to which the remote data service has access.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Various data services allow remote user access. For example, a remote server may receive and process requests from client devices to gain access to data hosted by the server. As another example, a remote data service may, upon request, obtain data from one or more third-party servers and provide the obtained data to requesting client devices. Using their device, a user can request to gain direct access to remotely hosted data, or request for a remote data service to transmit select data to their device.

A remote data service may implement an authentication scheme to limit access to data that is provided by the service. In particular, an authentication scheme may be employed by the remote data service to ensure that the data is accessible to only those requesting devices that are associated with authorized entities. The remote data service grants access to the data upon successful authentication of requesting user and/or client device identities.

The authentication scheme of a remote data service may be implemented with a view to striking a balance between security of data and convenience of access. An onerous procedure for authentication may cause undesired delays in access to the requested data, whereas a naïve solution for authentication may sacrifice security of the data. The choice of authentication scheme may be based on the nature or type of data provided by the remote data service. For example, where the data comprises time-sensitive information, it may be advantageous to have a simple authentication mechanism that facilitates easy and quick access to the data for authorized users/client devices.

In an aspect, the present disclosure provides systems and methods for authenticating data access requests. Specifically, methods are disclosed for processing and authenticating user requests to access data provided by a remote data source. The methods may be performed by a computing system implementing a remote data service, such as a host server or an authentication server. Upon detecting that a user has successfully logged in to a remote data service using their client device, the computing system generates a data object (e.g. data string, such as a token). The data object represents, at least, a unique identifier for the user's client device and a validity period for the data object. The generated data object is sent to and stored on the client device. When the user later requests to access data via the remote data service, the client device presents the data object to the computing system for authentication. If the data object is valid at the time of the data access request, the remote data service obtains requested data and transmits all or parts of the obtained data to the requesting client device. The use of the data object obviates the need for the user to log in each time a data access request is made from the client device to the remote data service. More generally, the data object grants certain limited privileges (e.g. data access, operation permissions, etc.) for the remote data service to the client device.

In another aspect, the present disclosure provides a computing system for processing data access requests. The computing system may, for example, implement a remote data service that is configured to receive data access requests and provide requested data to requesting client devices. The computing system authenticates a user login to a remote data service. Upon authenticating the user login, the computing system generates a data object, such as a data string, which is transmitted to the user's device to be stored thereon. The user's device can, in subsequent data access requests to the remote data service, transmit the data object to the computing system. The computing system determines whether the data object is valid at the time of the data access request. If the data object is valid, the computing system may obtain requested data sets for transmitting to the user's device.

In yet another aspect, the present disclosure provides an authentication server. The authentication server processes user requests to gain access to remotely hosted data or services. In particular, the authentication server may function as an intermediary between client devices associated with requesting users and a remote data service. The authentication server is configured to authenticate a user login to a remote data service and, responsive to the authentication, generate a data object to transmit to the user's device. The data object is stored on the user's device and used in subsequent data access requests to the remote data service for authentication. In particular, the authentication server checks whether the data object of a data access request is valid, and if valid, obtains the requested data for transmitting to the user's device.

In yet another aspect, the present disclosure provides methods for obtaining remotely hosted data on a client device. Specifically, a method is disclosed for requesting access to data provided by a remote data service. The method may be implemented by a computing device associated with a user that is requesting access to remotely hosted data. For example, application software on a requesting user's computing device may be configured to perform all or parts of the disclosed method. Upon successful login of the user to a remote data service, the computing device receives a data object for use in authentication of subsequent data access request to the remote data service. The data object is stored securely on the computing device. When the computing device receives user input to generate a data access request to the remote data service, the computing device retrieves the stored data object and includes the data object in the data access request.

FIG. 1 is a schematic diagram illustrating an operating environment of an example embodiment. In particular, FIG. 1 illustrates exemplary components of a system 100 for authenticating data access requests to a remote data service. As a specific example, the system 100 of FIG. 1 may be implemented to facilitate, at least, processing of data access requests from a client device, real-time retrieval of data from one or more third-party data sources, and transmission of retrieved data to the requesting client device.

As illustrated, a data server 160 and client device 110 communicate via the network 120. The client device 110 is a computing device that is associated with an entity, such as a user or client, requesting access to data from the data server 160. The data server 160 may store various data or be configured to query one or more third-party servers or databases for data that is requested by the client device 110. In particular, the data server 160 may implement a remote data service. The data server 160 may, in some embodiments, be connected to one or more databases 180, which may be provided in secure storage. The secure storage may be provided internally within the data server 160 or externally. The secure storage may, for example, be provided remotely from the data server 160. For example, the secure storage may include one or more data centers.

The data server 160 may, in some embodiments, be a financial institution server and the entity may be a customer of a financial institution operating the financial institution server.

The client device 110 may be used to configure a data access request to a remote data service. More particularly, the client device 110 may be used for requesting to gain direct access to data at the data server 160 or to receive data that is accessible via the data server 160. For example, a user may request, using the client device 110, for the data server 160 to retrieve real-time data from one or more third-party data sources. The requested data may, for example, comprise user content (e.g. social network data) or data streams from various feeds, such as financial data feeds. A data access request may be for real-time data or time-delayed/historical data.

The client device 110 is configured to receive input of various information. In particular, a user may input information relating to the data access requests on the client device 110. For example, one or more applications on the client device 110 may allow the user to indicate various details about the data to request from the data server 160 including, without limitation, specific data items, third-party data source(s), and time and/or frequency of data retrieval. In the specific example of access requests for financial data, the client device 110 may receive input of, among others, one or more tradeable objects, identities of financial data feeds to query, and frequency of data retrieval from the feeds.

The data server 160 is configured to obtain data from one or more third-party data sources. For example, the data server 160 may be connected to data feeds which provide streams of data to the data server 160. The data server 160 may also monitor one or more data sources on an on-going basis and obtain data from the sources at specific times/intervals. In some embodiments, the data server 160 may monitor various data sources for changes or updates to certain data items and retrieve data relating to the data items when the changes/updates are detected. The retrieved data may be stored at the data server 160 as recent data for the data items. In some embodiments, the data server 160 may retrieve data in accordance with timing and/or frequency requirements specified in data access requests from requesting client devices. For example, a data access request may specify times at which data from a certain feed (or database, etc.) is requested to be retrieved by the data server 160.

As shown in FIG. 1, the system 100 may also include an authentication server 150 that may be separate from the data server 160. The authentication server 150 is connected to the data server 160, and performs a function of authenticating data access requests that are directed to the data server 160. Specifically, the authentication server 150 is configured to verify that the requesting user/client device is authorized to access the requested data from the data server 160. In some embodiments, when a user makes a data access request on their device, the request may first be sent to the data server 160 and subsequently forwarded to the authentication server 150 for user and/or device authentication. Alternatively, the authentication server 150 and the data server 160 may be arranged such that data access requests originating from client devices are automatically forwarded to the authentication server 150, and only those requests that are authenticated by the authentication server 150 are relayed to the data server 160. The authentication server 150 may be configured to perform the methods for authenticating data access requests that are disclosed in the present application.

The client device 110, the authentication server 150, and the data server 160 may be in geographically disparate locations. Put differently, the client device 110 may be remote from the authentication server 150 and/or the data server 160. The client device 110, the authentication server, and the data server 160 are computer systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
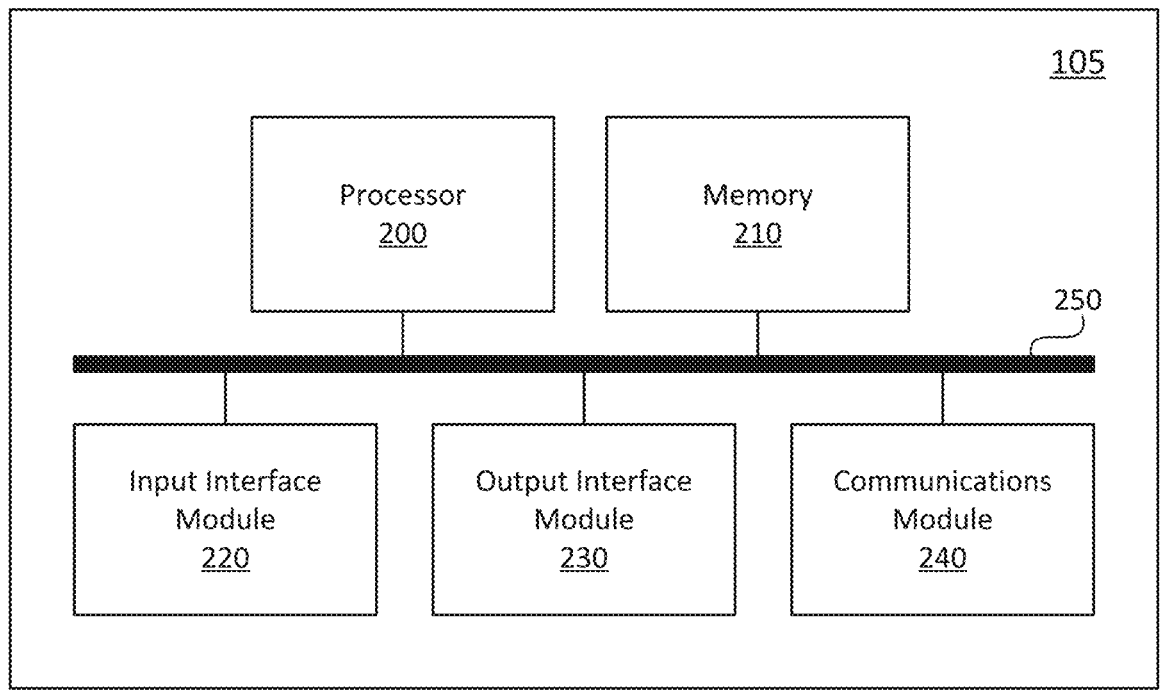
FIG. 2 is a high-level schematic diagram of an example computing device.

FIG. 2 is a high-level operation diagram of the example computing device 105. In some embodiments, the example computing device 105 may be exemplary of one or more of the client device 110, the authentication server 150, and the data server 160. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. The output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communication signals. Communication signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Alternatively, instructions may be executed by the processor 200 directly from read-only memory of memory 210.

Figure 3:
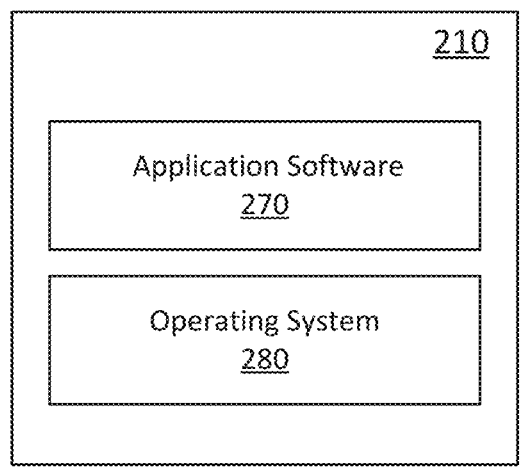
FIG. 3 shows a simplified organization of software components stored in memory of the example computing device of FIG. 2.

FIG. 3 depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing a particular function. The application software 270 may, for example, comprise a data access request application on a client device. The data access request application may be used for requesting data from a remote data service. In particular, the data access request application may allow users to generate, on the client device, requests to gain access to data that is hosted by a remote data service or receive data that is retrieved by the remote data service from third-party data sources. For example, the data access request application may be used to request real-time market data relating to one or more tradeable objects, such as securities or commodities. The data access request application may be configured to receive user selections of one or more tradeable objects and request a remote data service to obtain market data relating to the selected tradeable objects. The user selections may, for example, be included in a "watch list" of tradeable objects. A "watch list" may be a list of tradeable objects that the user has purchased, shorted, or is considering purchasing or shorting. The requested market data for the selected tradeable objects may be obtained, for example, from third-party financial data feeds to which the remote data service has access. That is, the data access request application may direct user-generated data access requests to third-party services (or servers, etc.) which provide financial data feeds.

More generally, the data access request application may receive user input of, for example, requested data items, information identifying a remote data service, third-party data sources (from which data is requested to be retrieved by the remote data service), timing and/or frequency of data retrieval, and requester information (e.g. name, address, etc.). The application generates a data access request based on one or more of these inputs and transmits the request to the identified remote data service. Upon receiving the requested data from the remote data service, the received data may be presented via the application on the client device. For example, a graphical user interface for the data access request application may facilitate both entry of user input for generating a data access request and presentation of the requested data received from the remote data service.

The data access request application may be a stand-alone application, such as a mobile app, or integrated into another application or software module resident on the example computing device 105 as a sub-function or feature. In some embodiments, features of the data access request application may be integrated into a consumer tool for facilitating purchase of tradeable objects. For example, the data access request application may be a component of software for searching, selecting and purchasing various securities (or commodities, or other tradeable objects) online.

The data access request application is associated with a backend application server. In at least some embodiments, a data server (such as data server 160 of FIG. 1), from which data is requested by a client device 110, may also serve as the backend application server for the data access request application. In particular, various functions of the data access request application may be provided, at least in part, by a data server. For example, a server associated with a financial institution may perform backend services of the data access request application. Thus, the data server may be configured to store data or retrieve data from one or more third-party data sources.

Figure 4:
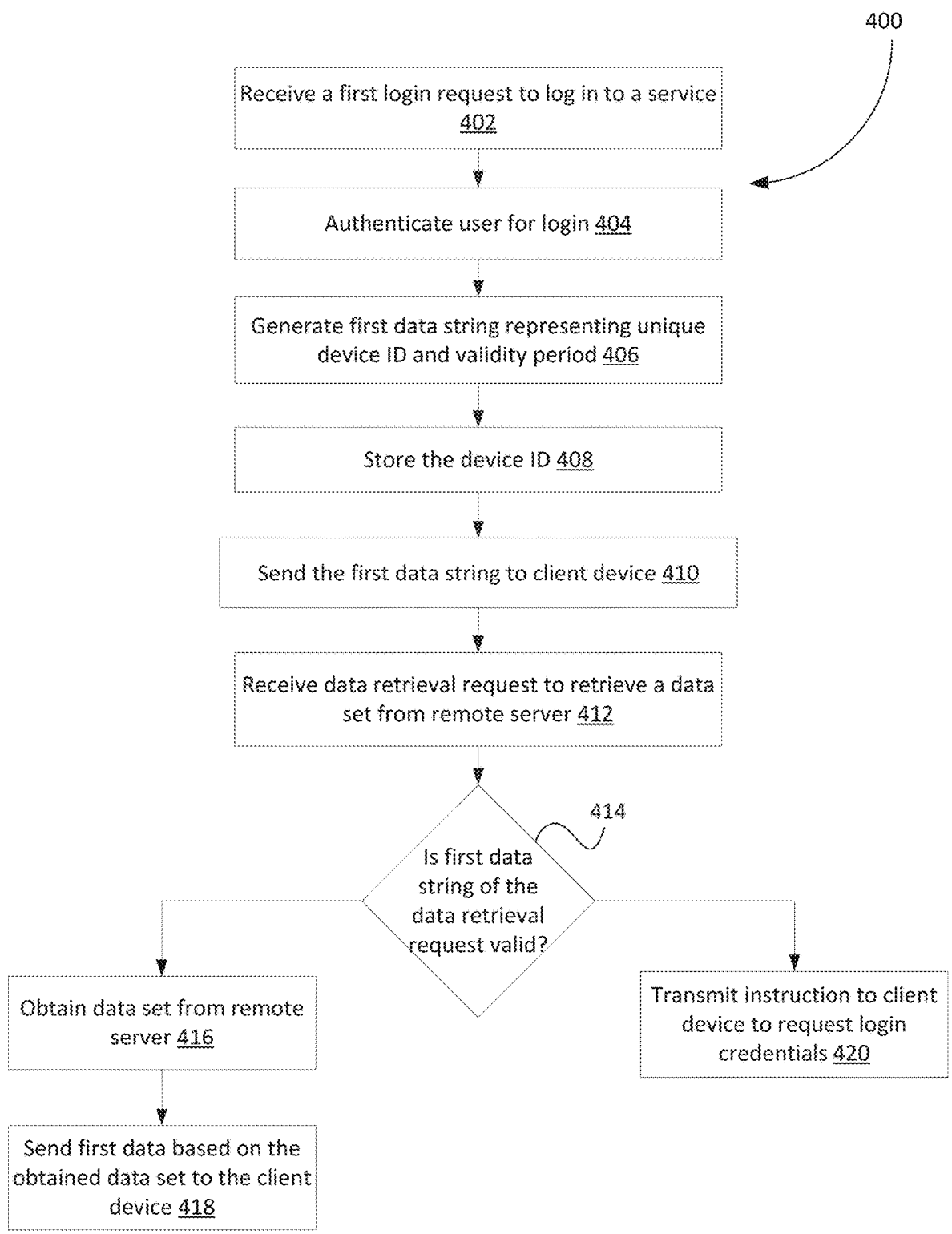
FIG. 4 shows, in flowchart form, an example method for authenticating data access requests from a client device.

Reference is made to FIG. 4, which shows, in flowchart form, an example method 400 for authenticating data access requests from a client device. More specifically, the method 400 allows for authenticating user requests to obtain data from a remote data service. Operations 402 and onward are performed by one or more processors of computing devices such as, for example, the processor 200 (FIG. 2) of one or more suitably configured instances of the example computing device 105 (FIG. 2). In at least some embodiments, the method 400 is implemented by a computing system implementing a remote data service. For example, the method 400 may be performed by a server, such as the authentication server 150 or data server 160 of FIG. 1, that is communicably connected to a client device associated with a user requesting access to data from a remote data service. The server may be an authentication server, which performs authentication functions for another server, or a data server configured for implementing a remote data service.

In operation 402, the server receives, from a client device, a first login request to log in to a remote data service. The client device is associated with a user attempting to log in to the remote data service. The first login request includes, at least, login credentials for a user of the client device. The login credentials may include, for example, a user identifier, such as a username, and a password (e.g. text-based), biometrics, or other authentication data for the user.

In operation 404, the server authenticates the user for login to the remote data service, based on the login credentials for the user. The server may, for example, query a database of records associated with entities that are authorized to access the remote data service to confirm that the login credentials of the first login request correspond to an authorized user. Once the user is successfully logged in, the server may create an active session for the user/client device at the remote data service. For example, a new authenticated user session may be added to an active sessions list that is maintained by the server for the remote data service. The server may, in some embodiments, implement a sessions manager which maintains active sessions data for the remote data service.

In response to authenticating the user for login to the remote data service, the server generates a data object representing, at least, a unique device identifier for the client device and a validity period, in operation 406. The data object is a data string (an "authentication data string"). The authentication data string may be used by the client device to authenticate to the remote data service, such that repeated logins by the client device are not required on subsequent attempts to access the remote data service. In some embodiments, the authentication data string may represent additional information including, for example, an identifier for the authenticated user and a version identifier. For example, the authentication data string may comprise a concatenation of all or parts of textual representations of a user or device identifier, validity period, and a version identifier.

A unique identifier may be generated by the server and assigned to the client device, allowing the client device to be distinguished from other devices that are authorized to access the remote data service. The validity period is also set by the server and assigned to the client device. The validity period defines a period of time during which the authentication data string is valid for authenticating the client device to the server. In some embodiments, the validity period may define an expiry date for the authentication data string. The expiry date may be set, for example, as a predetermined number of days from a time of receipt of a login request from the client device. In particular, the authentication data string may be valid for authentication purposes only for a fixed period of time which starts from the most recent login of the user/client device to the remote data service.

In operation 408, the device identifier (and/or the user identifier) is stored in memory of the server. For example, the device identifier may be stored in a record of a database containing historical login data for the remote data service. In some embodiments, other information may be stored in association with the device identifier. For example, one or more of the user identifier, authentication data string, version identifier, and validity period for the authentication data string may be stored in association with the device identifier at the server. The server then sends the authentication data string to the client device, in operation 410. The authentication data string is stored securely on the client device. In particular, the authentication data string may be stored in secure storage such that other applications cannot access the authentication data string. For example, the authentication data string may be stored in a data sandbox that is walled-off from other software modules in the memory of the client device.

The server later receives, from the client device, a data retrieval request to retrieve data from one or more remote sources, in operation 412. Specifically, a user request for the remote data service to obtain data from one or more remote sources is transmitted from the client device to the server. In some embodiments, the data retrieval request may be a request to retrieve real-time data from various data feeds. For example, the client device may request the remote data service to retrieve real-time quotes for one or more tradeable objects, such as securities or commodities.

The data retrieval request may be received by the server after an active session for the user has been terminated. In particular, the data retrieval request may be received at a time when the user is no longer logged in to the remote data service. The active session for the user may have been terminated by, for example, a user logout or expiry due to inactivity.

The method 400 provides a technique for the client device to authenticate to the remote data service for requesting data retrieval, without requiring the user to expressly log in to the remote data service. The data retrieval request includes the authentication data string associated with the client device. In some embodiments, a data access request application on the client device may generate a data retrieval request by including a copy of the authentication data string that is stored on the client device. In operation 414, the server determines whether the authentication data string of the data retrieval request is valid. In particular, the server checks the validity period associated with the authentication data string. For example, the server may extract the validity period information directly from the authentication data string, or it can cross-reference a database of historical logins for the remote data service to identify a validity period that is associated with the (unique) device identifier for the client device.

The authentication data string of the data retrieval request may be determined to be valid if a current date falls within the validity period for the authentication data string. That is, if the date on which the data retrieval request is received by the server is within the validity period, the authentication data string may be deemed valid. The server thus compares the current date associated with the data retrieval request with the validity period for the authentication data string. In some embodiments, the server may additionally check other information to confirm that the authentication data string is valid. For example, the server may determine whether the authentication data string is valid based on checking the version of the authentication data string. The server may, for example, confirm that the authentication data string of the data retrieval request has a current version identifier.

When the authentication data string is valid, the server obtains data requested by the client device, in operation 416. In particular, the server may generate queries based on the requested data items and transmit the queries to one or more remote data sources. For example, a data retrieval request from the client device may include a "watch list" of tradeable objects for which data is requested to be retrieved. The server may query one or more remote data sources, such as market data feeds, to retrieve data (e.g. quote data) relating to the tradeable objects that are included in the "watch list". The server receives outputs of the queries, in the form of data sets, from the remote data sources. In operation 418, the server sends, to the client device, select data based on the obtained data sets. For example, the server may send all or part of the data received from the remote data sources to the client device.

If, however, at operation 414 the server determines that the authentication data string of the data retrieval request is not valid, the server may cause the client device to prompt the user for a login to the remote data service, in operation 420. An invalid authentication data string cannot be used to authenticate the client device to the remote data service. In at least some embodiments, the server may transmit, to the client device, a message containing an instruction to request login credentials from a user of the client device. That is, the server prompts the client device to authenticate anew to the remote data service.

Figure 5:
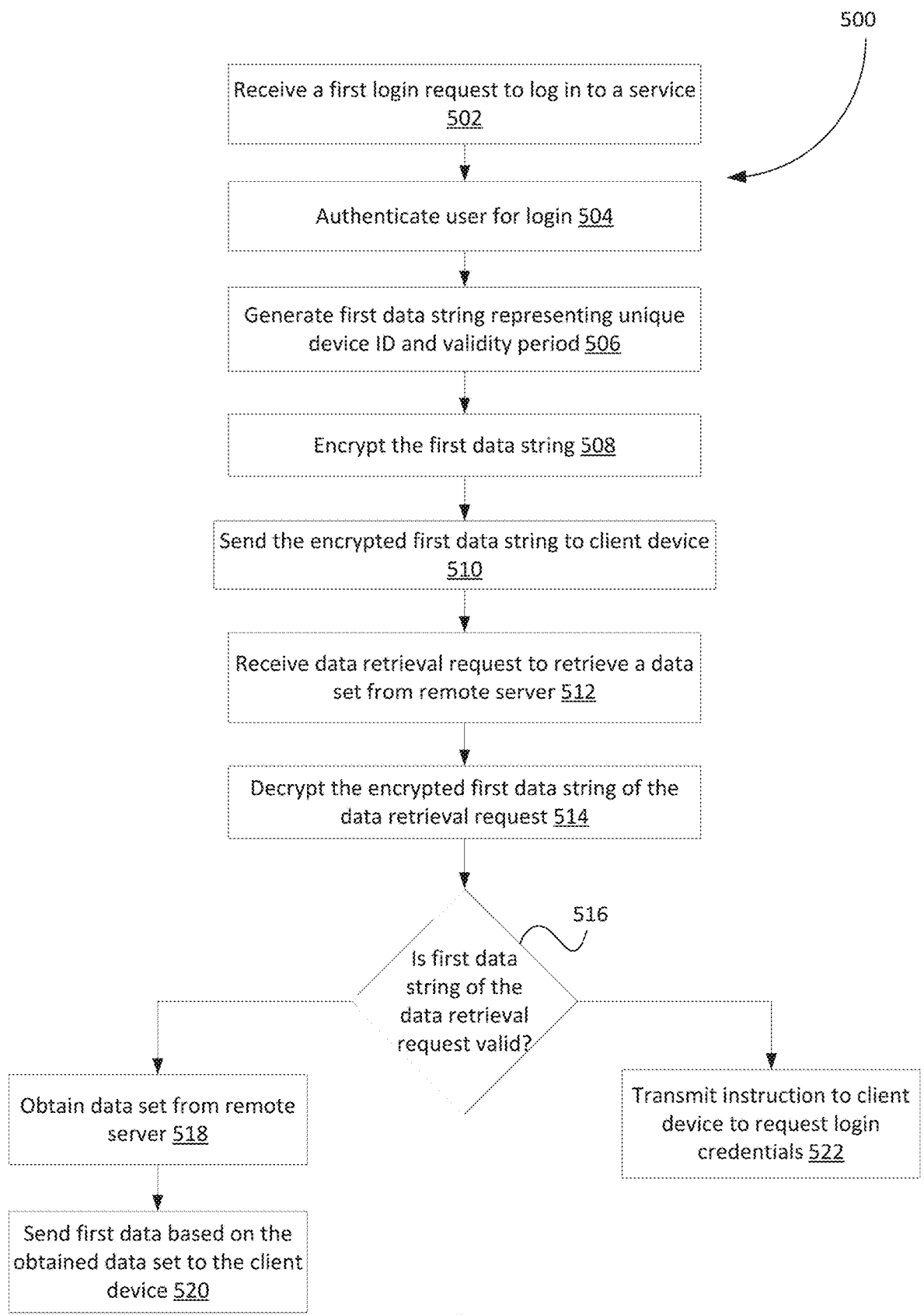
FIG. 5 shows, in flowchart form, another example method for authenticating data access requests from a client device.

Reference is now made to FIG. 5, which shows, in flowchart form, another example method 500 for authenticating data access requests from a client device. Operations 502 and onward are performed by one or more processors of computing devices such as, for example, the processor 200 (FIG. 2) of one or more suitably configured instances of the example computing device 105 (FIG. 2). In at least some embodiments, the method 500 is implemented by a computing system implementing a remote data service. For example, the method 500 may be performed by a server, such as the authentication server 150 or data server 160 of FIG. 1, that is communicably connected to a client device.

Operations 502, 504, 506 correspond to operations 402, 404 and 406 of method 400. In operation 502, the server receives, from a client device, a first login request to log in to a remote data service. The first login request includes login credentials for a user of the requesting client device. In operation 504, the server authenticates the user for the login, based on the login credentials, and in operation 506, the server generates an authentication data object to provide to the client device. The authentication data object is a data string which represents at least a unique device identifier for the client device and a validity period for the authentication data object.

In at least some embodiments, the authentication data string is encrypted prior to sending to the client device. In operation 508, the server encrypts the generated authentication data string. The encryption step ensures confidentiality of the authentication data string and that the message containing the authentication data string has not been tampered with. For example, the server may use the same key for both encryption and decryption of the authentication data string (symmetric key algorithm). The key is stored at the server. In particular, the key may be stored in association with a device identifier for the client device. The server sends the encrypted authentication data string to the client device, in operation 510.

The server later receives a data retrieval request from the client device. In operation 512, the server receives a request to retrieve a data set from a remote data source to which the server is connected and has access. The remote data sources from which to retrieve data may, in some embodiments, be identified by the client device in the data retrieval request. The data retrieval request includes the encrypted authentication data string. In operation 516, the server determines whether the authentication data string is valid. As part of this operation, the server decrypts the encrypted authentication data string of the data retrieval request using the same key (stored at the server) that was used in the encryption operation.

If the decrypted authentication data string is determined to be valid, based on one or more of the criteria discussed above with respect to operation 414 of method 400, the server obtains data requested by the client device from the remote data sources, in operation 518. For example, the server may query the remote data sources to receive data sets requested by the client device. The server then sends select data to the client device, based on the obtained data sets, in operation 520. In some embodiments, the select data may comprise values for only those data fields that are identified in the data retrieval request. In particular, the select data may be a subset of the obtained data sets which includes specific data values requested in the data retrieval request. In some embodiments, the obtained data sets may be filtered based on one or more rules/policies to select the data that will be sent to the client device. For example, the obtained data sets may be filtered to identify only "new data" or data that is different from recent data sets retrieved by the server for the same requested data items.

If, on the other hand, the decrypted authentication data string is determined to be invalid, the server transmits a message including an instruction to prompt the user of the client device to log in to the remote data service using their login credentials.

Figure 6:
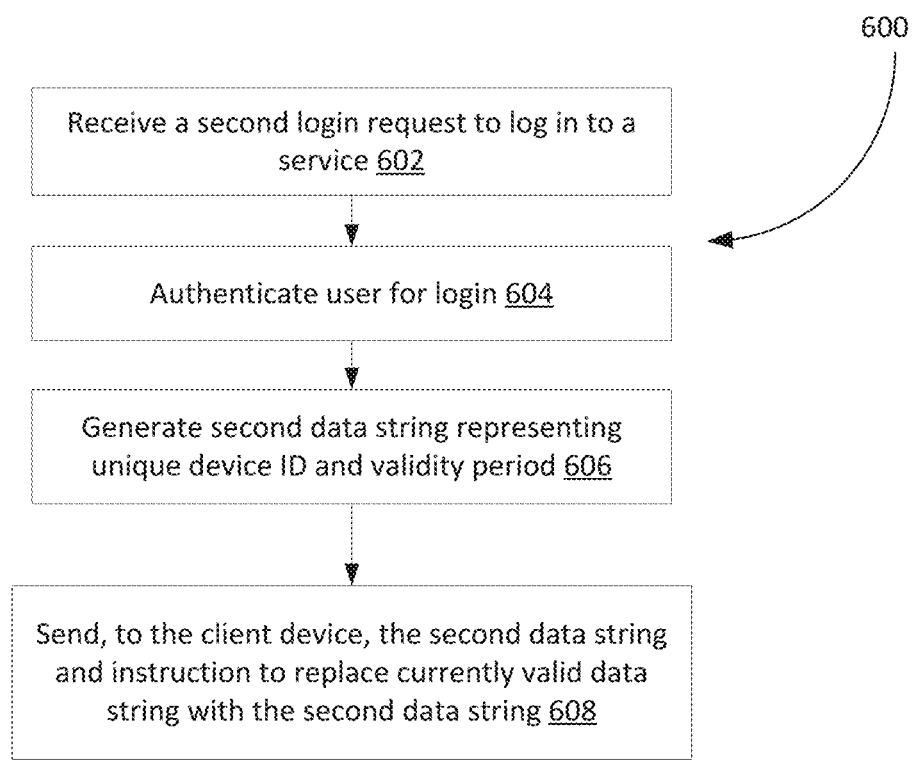
FIG. 6 shows, in flowchart form, an example method for updating access privileges of a client device for accessing data from a remoted data service.

Reference is now made to FIG. 6, which shows, in flowchart form, an example method 600 for updating access privileges of a client device for accessing data from a remoted data service. Operations 602 and onward are performed by one or more processors of computing devices such as, for example, the processor 200 (FIG. 2) of one or more suitably configured instances of the example computing device 105 (FIG. 2). In at least some embodiments, the method 600 is implemented by a computing system implementing a remote data service. For example, the method 600 may be performed by a server, such as the authentication server 150 or data server 160 of FIG. 1, that is communicably connected to a client device. In at least some embodiments, the method 600 may be performed by a server in conjunction with any one of methods 400 and 500 described above. In particular, as will be explained further, a server may perform all or parts of method 600 in updating access privileges of a user that has already logged in to a remote data service and whose data access requests have been authenticated in accordance with the operations of method 400 and/or 500.

In operation 602, the server receives, from a client device, a second login request from a user to log in to a remote data service. The second login request is received after the user has already been successful logged in to the remote data service. The second login request is subsequent to a previous login request from the user that was received and processed by the server. Thus, the client device may already have a valid authentication data object/string from the previous login of the user to the remote data service. That is, the client device may have an authentication data object that was generated by the server upon the previous successful login of the user.

In operation 604, the server authenticates the user for login to the remote data service, based on login credentials provided as part of the second login request. In response to authenticating the user, the server generates a second data object (i.e. second authentication data string), in operation 606. This second authentication data string is different from the previous authentication data object stored on the client device. The second authentication data string includes a (unique) device identifier of the client device and a validity period for the second data object. For example, the second authentication data string may be an encrypted data string that includes the client device identifier and an expiry date for the second data object that is different from an expiry date for the previous authentication data object.

In operation 608, the server sends the second authentication data string to the client device and an instruction to replace a currently valid authentication data object with the second authentication data string. In this way, the server effectively renews an authentication data string associated with the client device. For example, the second authentication data string may have a validity period that extends beyond a validity period for a previous authentication data string that was valid for the client device.

More generally, each time that a user login request is received by the server from a client device, the server may generate a new authentication data object for the client device. The new authentication data object is transmitted to the client device to be stored thereon, and can be used by the client device on subsequent data access requests to authenticate to the remote data service. Each new authentication data object may have a new validity period. For example, the validity period may be a predetermined time period which starts on the date that the new authentication data object is generated by the server. Accordingly, each time a user successfully authenticates to the remote data service, the validity period of a current authentication data object for the client device may be automatically extended. This effectively extends the window of time during which a user of the client device may access data provided by the remote data service, without needing to log in to do so.

In some embodiments, the server may track, for each of one or more client devices that are authenticated to the remote data service, information about a current authentication data object for that client device. In particular, the server may store information about current authentication data objects for a plurality of authenticated client devices. For example, the server may maintain records of the validity periods for the authentication data objects that are assigned to client devices.

Figure 7:
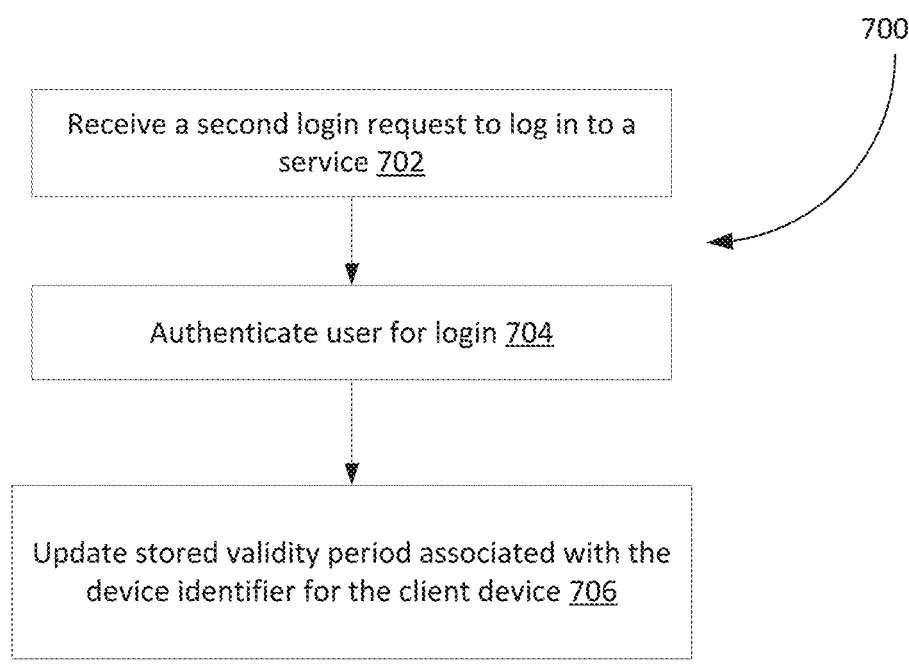
FIG. 7 shows, in flowchart form, another example method for updating access privileges of a client device for accessing data from a remoted data service.

An example of this approach for authenticating client devices is illustrated in FIG. 7. FIG. 7 shows, in flowchart form, another example method 700 in which a server updates access privileges of a client device for accessing data from a remote data service. In operation 702, the server receives, from a client device, a second user request to log in to a remote data service. The second login request is received after the user has previously been authenticated and successfully logged in to the remote data service. In operation 704, the server authenticates the user for login, based on login credentials provided in the second login request. Instead of generating a new authentication data object, in operation 706, the server updates information regarding a current authentication data object for the client device. That is, once a user successfully logs in to the remote data service, the server may automatically update information, stored and managed at the server, about a current authentication data object that is assigned to the client device. For example, the server may update a database record associated with the client device to change the stored validity period of the authentication data object for that client device. More generally, each time that a user logs in to the remote data service from the client device, the server may update stored information about a current authentication data object which can be used by the client device for authentication to the remote data service. The server can thus validate subsequent data access requests from the client device, without having to generate a new authentication data object for transmitting to the client device.

Figure 8:
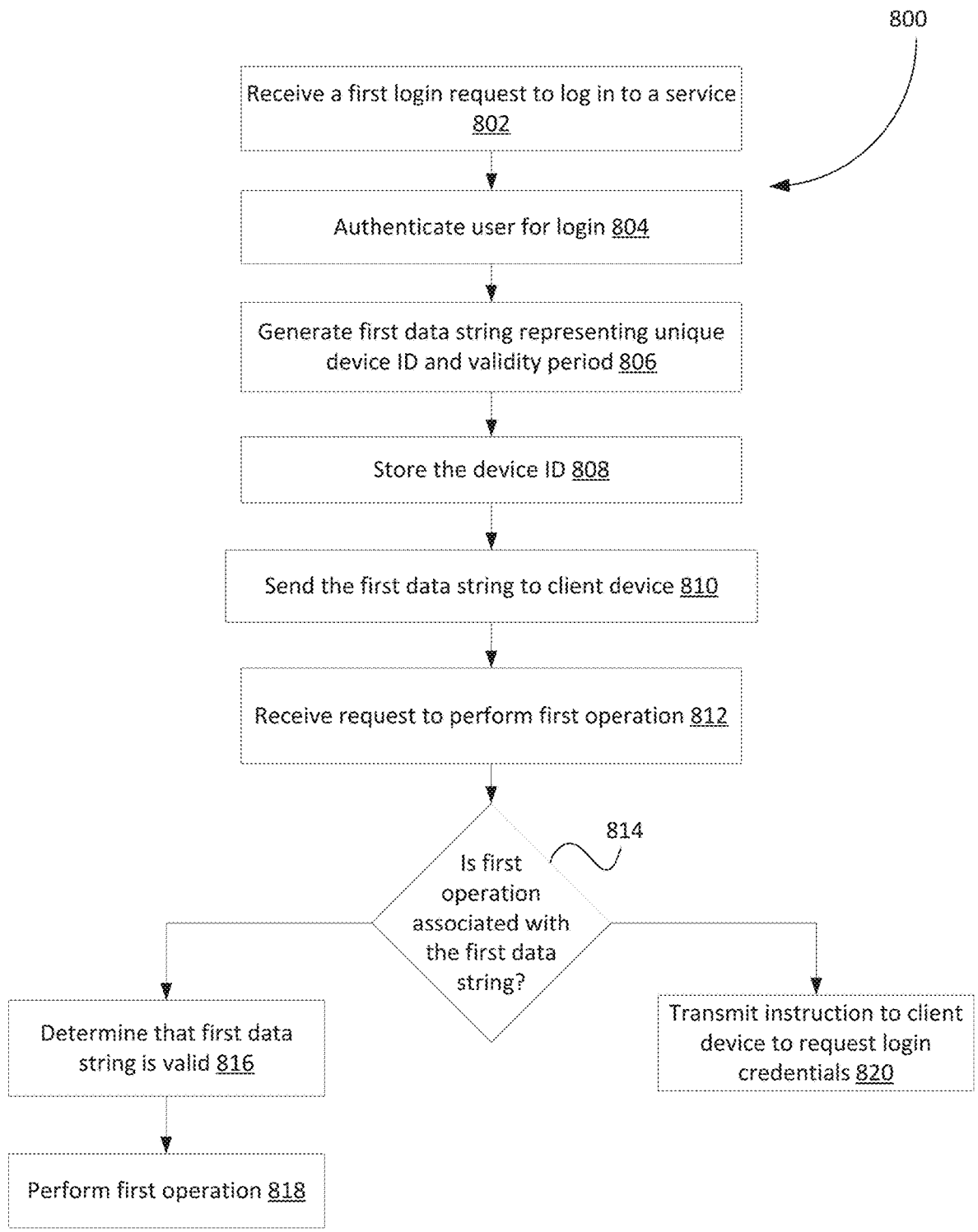
FIG. 8 shows an example method for authenticating requests from a client device to perform select operations at a remote data service.

Reference is now made to FIG. 8, which shows, in flowchart form, an example method 800 for authenticating requests from a client device to perform select operations at a remote data service. Operations 802 and onward are performed by one or more processors of computing devices such as, for example, the processor 200 (FIG. 2) of one or more suitably configured instances of the example computing device 105 (FIG. 2). In at least some embodiments, the method 800 is implemented by a computing system implementing a remote data service. For example, the method 800 may be performed by a server, such as the authentication server 150 or data server 160 of FIG. 1, that is communicably connected to a client device.

A remote data service may provide a myriad of services for a client device. In particular, a remote data service may allow a client device to perform various operations that are available for the remote data service. For example, in addition to data access, a user may, using their device, perform operations such as edits, searches, and purchases of one or more tradeable objects at the remote data service. In such cases, users and/or sessions may be assigned different levels of authentication. A user that has successfully logged in to the remote data service for an authenticated session may have different levels of access compared to a user that has been assigned an authentication data object but is not currently logged in.

A server implementing such a remote data service that grants different levels of authentication may perform the operations of method 800. Operations 802, 804, 806, 808 and 810 correspond to operations 402, 404, 406, 408 and 410 of method 400 described above. In operation 802, the server receives a login request for a user to log in to the remote data service. The server authenticates the user for login, in operation 804, and generates an authentication data string for the client device. A unique device identifier for the client device is stored at the server, in operation 808, and the newly generated authentication data string is sent to the client device in operation 810.

The server later receives a request, from the client device, to perform a first operation, in operation 812. The request may be received after an authenticated user session at the remote data service has been terminated. The request includes the authentication data string assigned to the client device. In response to receiving the request, the server determines whether the first operation is associated with the authentication data string. That is, the server checks whether the authentication data string provides sufficient level of authority for the client device to request the server to perform the first operation at the remote data service. If the server determines that the authentication data string is valid and is associated with the first operation, the server performs the first operation in operation 818. For example, the server may determine validity of the authentication data string for the client device based on the approaches described above with respect to operation 414. If the authentication data string is not valid or if the authentication data string is not associated with the first operation, the server transmits a message containing an instruction to the client device to prompt a user of the client device to log in using their login credentials. In this way, an authenticated user session may be distinguished from a semi-authenticated user session (i.e. not logged in, but the authentication data object provided by the client device is valid) at the remote data service. Specifically, the user may have access to all operations that are available at the remote data service in an authenticated session, whereas operations may be restricted in a semi-authenticated user session. As a particular example, a user may be permitted to view real-time market data for tradeable objects of a "watch list" in a semi-authenticated user session, but may not be permitted to place trades or edit the "watch list" in the session until a full login is performed for the remote data service using the client device. Once the user logs in to the remote data service, a new authentication data object is generated by the server and sent to the client device, and the user is granted access to privileges of an authenticated session.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor;
a communications module coupled to the processor; and
a memory coupled to the processor, the memory storing instructions that, when executed, configure the processor to:
  authenticate a user for login to a service for a first authenticated user session;
  in response to authenticating the user, generate a first data string associated with a first validity period;
  send, to a client device associated with the user, the first data string;
  receive, via the communications module from the client device, a data access request to access a first data set at a remote data source, the data access request including the first data string;
  determine that the first authenticated user session has been terminated at a time of receiving the data access request;
  validate the first data string based on checking the first validity period; and
  in response to determining that the first authenticated user session has been terminated and that the first data string is valid, transmit, to the client device, a data access response including at least a subset of the first data set.

2. The computing system of claim 1, wherein the instructions, when executed, further configure the processor:
in response to determining that the first data string is not valid, transmit, to the client device, an instruction to request login credentials from the user of the client device.

3. The computing system of claim 1, wherein the first validity period defines an expiry date set as a predetermined number of days from a time of receipt of a login request from the client device to log the user in to the service.

4. The computing system of claim 1, wherein the instructions, when executed, further configure the processor to encrypt the first data string prior to sending the first data string to the client device, and wherein validating the first data string comprises decrypting the encrypted first data string.

5. The computing system of claim 1, wherein the first data string represents a version identifier that is stored in the memory, and wherein validating the first data string is based on checking a version associated with the first data string.

6. The computing system of claim 1, wherein the instructions, when executed, further configure the processor to:
authenticate the user for login to the service for a second authenticated user session subsequent to the first authenticated user session;
in response to authenticating the user for the second authenticated user session, generate a second data string different from the first data string; and
send, to the client device, the second data string and an instruction to replace any currently valid data string stored at the client device with the second data string.

7. The computing system of claim 1, wherein the data access response includes at least the subset of the first data set in response to determining that access of the first data set is a permitted operation in a non-authenticated user session.

8. The computing system of claim 1, wherein validating the first data string comprises determining that a current date falls within the first validity period.

9. The computing system of claim 1, wherein the data access request comprises a request to retrieve real-time quotes for one or more tradeable objects, and wherein the instructions, when executed, further configure the processor to transmit, to the remote data source, a query for real-time quotes data.

10. The computing system of claim 1, wherein the first data string is associated with a predetermined set of operations, and wherein the instructions, when executed, further configure the processor to:
receive, via the communications module from the client device, a request to perform a first operation; and
in response to determining that the first operation is not among the predetermined set of operations associated with the first data string, transmit, to the client device, an instruction to request login credentials from a user of the client device.

11. A computer-implemented method, comprising:
authenticating a user for login to a service for a first authenticated user session;
in response to authenticating the user, generating a first data string associated with a first validity period;
sending, to a client device associated with the user, the first data string;
receiving, from the client device, a data access request to access a first data set at a remote data source, the data access request including the first data string;
determining that the first authenticated user session has been terminated at a time of receiving the data access request;
validating the first data string based on checking the first validity period; and
in response to determining that the first authenticated user session has been terminated and that the first data string is valid, transmitting, to the client device, a data access response including at least a subset of the first data set.

12. The method of claim 11, further comprising:
in response to determining that the first data string is not valid, transmitting, to the client device, an instruction to request login credentials from the user of the client device.

13. The method of claim 11, wherein the first validity period defines an expiry date set as a predetermined number of days from a time of receipt of a login request from the client device to log the user in to the service.

14. The method of claim 11, further comprising encrypting the first data string prior to sending the first data string to the client device, and wherein validating the first data string comprises decrypting the encrypted first data string.

15. The method of claim 11, wherein the first data string represents a version identifier that is stored in memory, and wherein validating the first data string is based on checking a version associated with the first data string.

16. The method of claim 11, further comprising:
authenticating the user for login to the service for a second authenticated user session subsequent to the first authenticated user session;
in response to authenticating the user for the second authenticated user session, generating a second data string different from the first data string; and
sending, to the client device, the second data string and an instruction to replace any currently valid data string stored at the client device with the second data string.

17. The method of claim 11, wherein the data access response includes at least the subset of the first data set in response to determining that access of the first data set is a permitted operation in a non-authenticated user session.

18. The method of claim 11, wherein validating the first data string comprises determining that a current date falls within the first validity period.

19. The method of claim 11, wherein the data access request comprises a request to retrieve real-time quotes for one or more tradeable objects, and wherein the instructions, when executed, further configure the processor to transmit, to the remote data source, a query for real-time quotes data.

20. The method of claim 11, wherein the first data string is associated with a predetermined set of operations, and wherein the method further comprises:
receiving, from the client device, a request to perform a first operation;
in response to determining that the first operation is not among the predetermined set of operations associated with the first data string, transmitting, to the client device, an instruction to request login credentials from a user of the client device.

* * * * *